(12) United States Patent
Black et al.

(10) Patent No.: US 12,697,591 B2
(45) Date of Patent: Aug. 4, 2026

(54) SPLASHGUARD AND CASSETTE ASSEMBLY FOR STERILITY TESTING

(71) Applicant: RAPID MICRO BIOSYSTEMS, INC., Lowell, MA (US)

(72) Inventors: Hunter Black, Cambridge, MA (US); David Lefort, Lowell, MA (US); John Blaisdell, Lowell, MA (US); Alexis Sauer-Budge, Lowell, MA (US); Steven Kreuzer, Lowell, MA (US); Lindsey Gilman, Upton, MA (US); Blair Morad, Ipswich, MA (US)

(73) Assignee: RAPID MICRO BIOSYSTEMS, INC., Lowell, MA (US)

( * ) Notice: Subject to any disclaimer, the term of this patent is extended or adjusted under 35 U.S.C. 154(b) by 641 days.

(21) Appl. No.: 18/065,247

(22) Filed: Dec. 13, 2022

(65) Prior Publication Data

US 2024/0192110 A1    Jun. 13, 2024

(51) Int. Cl.
    *B01D 63/08*      (2006.01)
    *G01N 15/06*      (2006.01)
(52) U.S. Cl.
    CPC ....... *B01D 63/087* (2013.01); *G01N 15/0618* (2013.01); *B01D 2313/08* (2013.01)
(58) Field of Classification Search
    CPC . G01N 15/0618; B01L 3/502; B01D 2313/04; B01D 2313/08; B01D 63/087
    See application file for complete search history.

(56) References Cited

U.S. PATENT DOCUMENTS

| | | | | | |
|---|---|---|---|---|---|
| 6,030,539 | A | * | 2/2000 | Zuk, Jr. .................. | B01D 61/18 |
| | | | | | 210/488 |
| 11,788,046 | B2 | * | 10/2023 | Aviles .................... | C12M 29/00 |
| | | | | | 435/297.1 |
| 2006/0045821 | A1 | * | 3/2006 | McKelvy ............... | G01N 21/05 |
| | | | | | 422/130 |
| 2021/0269758 | A1 | * | 9/2021 | Aviles ..................... | C12Q 1/22 |

FOREIGN PATENT DOCUMENTS

| | | | |
|---|---|---|---|
| EP | 2776550 A2 | 9/2014 | |
| EP | 2776550 B1 | * 1/2018 | ............... C12Q 1/22 |

OTHER PUBLICATIONS

International Search Report and Written Opinion for Application No. PCT/US2023/082875, mailed Feb. 12, 2024, 12 pages.

* cited by examiner

*Primary Examiner* — Nathaniel J Kolb
(74) *Attorney, Agent, or Firm* — Goodwin Procter LLP

(57)        ABSTRACT
Membrane filtration is a technique for performing sterility testing on products, in which a sample is introduced to a sterile environment (such as a cassette) through an inlet port and then passed through one or more filters. The samples may be pumped into the cassette at a relatively high pressure, which can cause the sample to spray, mist, or foam. When the sample sprays in this manner, it can cause inconsistent results and can obscure the view through the lid of the cassette, which makes it difficult to analyze the incubated media. Exemplary embodiments provide a unique splash guard sized and shaped to transition the incoming sample fluids from a high-pressure state to a lower pressure flow. Consequently, the fluid flows more smoothly into the cassette which yields more consistent and accurate results.

18 Claims, 5 Drawing Sheets

DEPLOY BASE ASSEMBLY, MEMBRANE, AND MID-BODY ASSEMBLY 502

ALIGN SPLASHGUARD 504

ATTACH SPLASHGUARD 506

DEPLOY LID 508

INSERT A FLUID DELIVERY DEVICE INTO THE INLET 510

CAUSE A FLUID TO BE DELIVERED TO THE INLET 512

REDIRECT FLUID WITH SPLASHGUARD 514

PASS FLUID THROUGH MEMBRANE 516

RELEASE FLUID THROUGH OUTLET 518

SPLASHGUARD AND CASSETTE ASSEMBLY FOR STERILITY TESTING

BACKGROUND

In some circumstances, especially when products are developed for human consumption, it may be necessary or desirable to test the products to determine whether contaminating microorganisms are present. One technique for testing such products involves membrane filtration. In membrane filtration, a sterile environment (such as a specially-designed cassette) is prepared. A sample is introduced to the environment and filtered through one or more membrane filters. The filters may be selected with an appropriate pore size so that microorganisms of interest are retained in the filter. Appropriate growth media are transferred to the filters and the microorganisms are incubated on the growth media for a suitable period of time (e.g., 14 days). After the period of time elapses, the growth media is analyzed to determine whether microorganisms of interest are present.

BRIEF SUMMARY

In one aspect, an apparatus includes a cassette assembly includes one or more inlets configured to receive one or more fluids at a first pressure, a membrane filter, and an outlet configured to release the one or more fluids from the cassette assembly after the one or more fluids pass through the membrane filter, and a splashguard configured to interrupt a fluid flow between the inlet and the membrane filter.

The splashguard may be configured to reduce the pressure of the one or more fluids from the first pressure to a second pressure lower than the first pressure. For example, the splashguard may redirect the one or more fluids that enter the inlet in a radial direction of the cassette to a circumferential direction of the cassette. The splashguard may include a groove configured to change a direction of a flow of the one or more fluids. The splashguard may include a cover that extends between the inlet and the lid.

The splashguard may be provided between the lid and the mid-body assembly. In some embodiments, the splashguard may be provided on a foil cutter that is configured to be disposed between the lid and the mid-body assembly.

The cassette assembly may include a lid, a mid-body assembly including the inlet, and a base assembly includes the outlet.

The splashguard may include a through-hole configured to receive a fastener to attach the splashguard to the cassette assembly. The fastener may be built into the cassette assembly. The splashguard and the cassette assembly may comprise mating alignment elements.

A method for deploying the cassette assembly and splashguard may include assembling the cassette assembly and splashguard, inserting a fluid delivery device into the inlet, and causing a fluid to be delivered to the inlet, where the fluid is redirected by the splashguard.

For example, the inlet may include a septum, and inserting the fluid delivery device into the inlet may include piercing the rubber septum with a needle. Causing the fluid to be delivered to the inlet may include delivering the fluid through the needle.

Assembling the cassette assembly and splashguard may include inserting one or more fasteners attached to the cassette assembly into one or more through-holes of the splashguard.

Assembling the cassette assembly and splashguard may include aligning the splashguard to the cassette assembly using one or more mating alignment elements provided on the cassette assembly and the splashguard.

The method may also include using the splashguard to reduce a pressure of the fluid between the inlet and a membrane.

The cassette assembly may include a lid, a mid-body assembly including the inlet(s), and a base assembly includes the outlet. Assembling the cassette assembly may include placing the mid-body assembly on the base assembly, attaching the splashguard above the mid-body assembly, and placing the lid over the splashguard and mid-body assembly. Other embodiments may have inlet(s) and outlets in the mid-body assembly, may have inlet(s) and outlet(s) in the base, or may have separate inlet(s) and outlet(s) for the mid-body assembly and base.

Alternatively or in addition, a foil cutter may be provided on the mid-body assembly, where the splashguard is attached to the foil cutter.

The method may also include providing an seal (e.g., an o-ring, ultrasonic weld, heatstake, adhesive, bond, etc.) between the mid-body assembly and the base assembly, and/or providing an o-ring between the mid-body assembly and the lid.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In membrane filtration techniques, the sample(s) may be introduced to a cassette through an inlet port. The inlet port may include a rubber septum, which may be penetrated by a needle. The samples may be pumped into the cassette through the needle. This can result in a relatively high-pressure stream being fed into the cassette, which can cause the sample to spray, mist, or foam. When the sample sprays in this manner, it can cause inconsistent results and can obscure the view through the lid of the cassette, which makes it difficult to analyze the incubated media.

Exemplary embodiments described herein provide a unique splash guard sized and shaped to transition the incoming sample fluids from a high-pressure state to a lower pressure flow. Consequently, the fluid flows more smoothly into the cassette which yields more consistent and accurate results.

Figure 1:
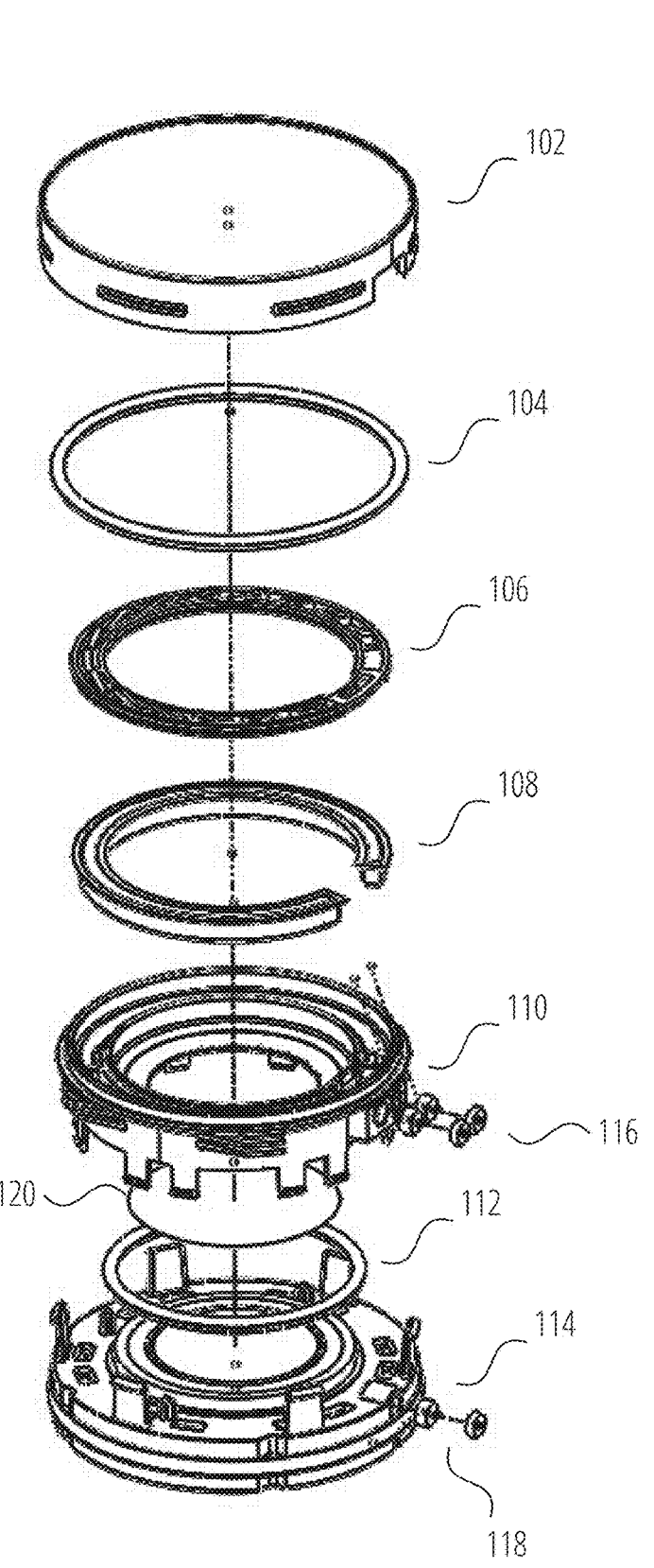
FIG. 1 illustrates an exemplary cassette assembly in accordance with one embodiment.
Figure 2:
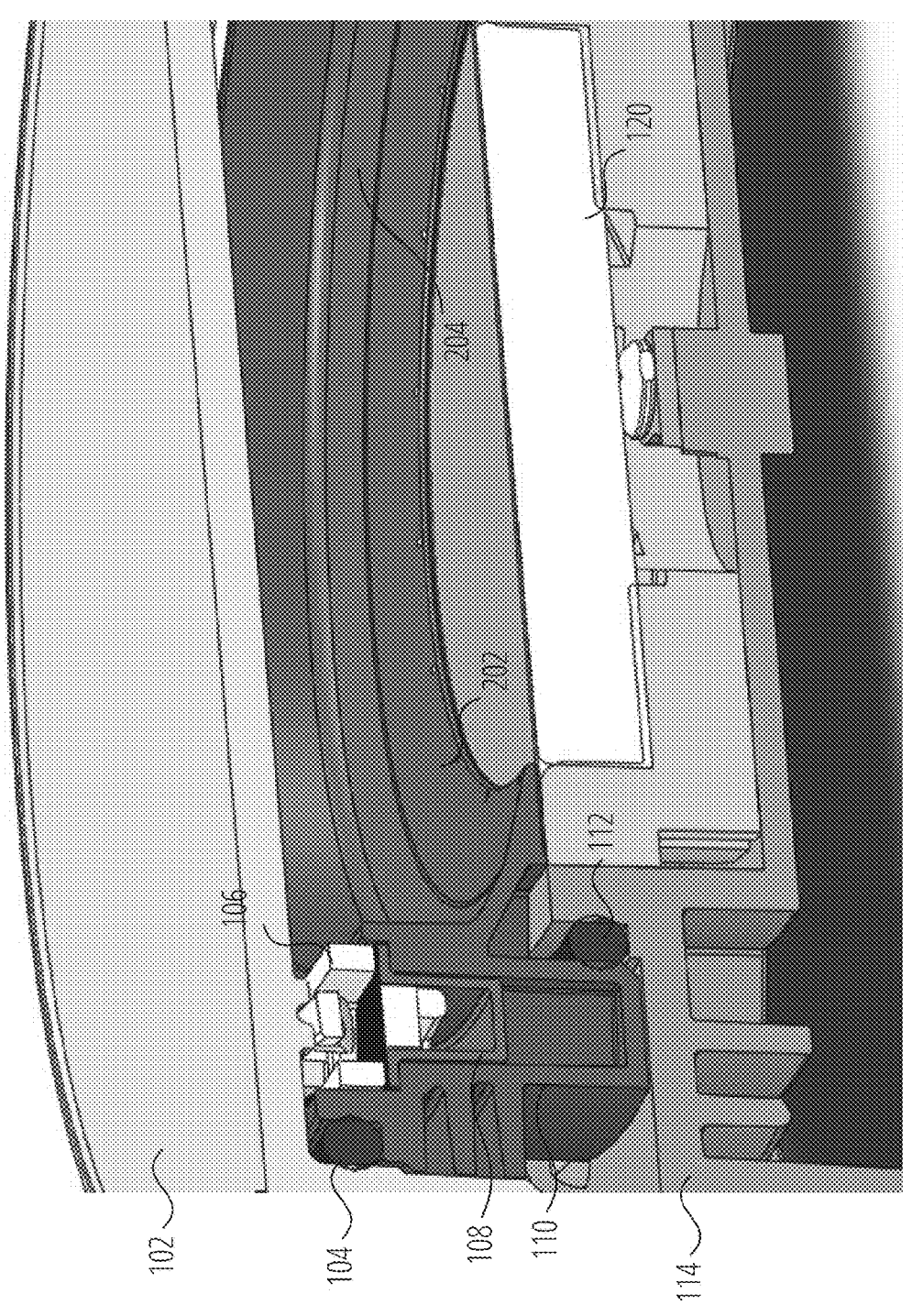
FIG. 2 is a close-up of a portion of a cross-sectional view of the cassette assembly in accordance with one embodiment.

An example of a cassette assembly 100 is shown in FIG. 1, and a cross-sectional side-view is shown in FIG. 2. The cassette assembly 100 may provide a sterile environment for testing. The cassette assembly 100 may provide an anaerobic or aerobic environment, depending on the application. Note that, for ease of discussion, the splashguard described in more detail below is omitted from FIG. 1 and FIG. 2 but can be deployed in the locations noted in connection with subsequent figures (or other suitable locations, such as attached to the mid-body assembly or the base).

From top to bottom in FIG. 1, the exemplary cassette assembly 100 includes a lid 102, an o-ring 104, an optional foil cutter 106, a scavenging tray assembly 108, a mid-body assembly 110, a membrane filter 120, a second seal 112, and a base assembly 114.

The base assembly 114 forms the bottom-most part of the cassette assembly 100 and serves as a supporting structure to which the other parts can be mounted. The base assembly 114 may be sized and shaped so as to be accommodated in an appropriate testing or analysis device.

A membrane filter 120 may be provided between the base assembly 114 and the mid-body assembly 110. The membrane filter 120 may be a part of a media pad sized and shaped to be accommodated by a corresponding recess in the base assembly 114. The membrane filter 120 may be any suitable filter and may have characteristics (such as a desired porosity) selected based on the particular application (e.g., the size of the microorganisms of interest that are intended to be captured by the membrane filter 120). In some embodiments, more than one membrane filter 120 may be provided, which may include multiple different types of membrane filters 120.

Target fluids for analysis may be passed through the membrane filter 120 and into the base assembly 114. The base assembly 114 may include a drain port 118 that allows the fluids to be removed from the cassette assembly 100 after filtration. The drain port 118 may include an opening provided in a part of the base assembly 114 internal to the cassette assembly 100 that connects to a specially shaped outlet on the exterior side of the cassette assembly 100. The outlet may be sized and shaped to mate with a drain manifold that receives the removed fluid and delivers it to an appropriate disposal location.

A seal 112 may be provided between the base assembly 114 and the mid-body assembly 110 to prevent fluid from leaking around and therefore bypassing the membrane filter 120. The mid-body assembly 110 includes a mid-body inlet 116 that allows the target fluid (or fluids) being analyzed to be admitted into the cassette assembly 100. The mid-body inlet 116 may include an opening provided in a part of the mid-body assembly 110 internal to the cassette assembly 100 that connects to an opening on the exterior side of the cassette assembly 100. Within the mid-body inlet 116 may be a structure, such as a rubber septum, that seals the cassette assembly 100. To admit a target fluid into the cassette assembly 100, a needle may be used to pierce the structure in the mid-body inlet 116 and deliver the fluid at a relatively high pressure (although exemplary embodiments are also compatible with a low-pressure fluid flow).

In some embodiments, more than one mid-body inlet 116 may be included in the mid-body assembly 110. For example, one mid-body inlet 116 may be provided for admitting a first sample (target fluid of interest for analysis) into the cassette assembly 100, while a second mid-body inlet 116 is provided for admitting a second, different sample. In other embodiments, a first mid-body inlet 116 may be provided for admitting a sample, while a second mid-body inlet 116 may be provided for admitting a growth medium.

The top of the mid-body assembly 110 may be shaped to accommodate an environmental conditioning tray 108, which may include a scavenging material that (for example) absorbs oxygen in the cassette assembly 100 (e.g., an $O_2$ scavenger, a desiccant, moisture beads, etc). The scavenging tray assembly 108 may be topped by foil that holds the scavenging material in place and protects it from outside air until the scavenging tray assembly 108 is deployed in the cassette assembly 100. To release the scavenging material, the cassette assembly 100 may be provided with a foil cutter 106 designed to penetrate the foil and allow the scavenging material to scavenge the environment within the sealed cassette assembly 100.

To seal the cassette assembly 100, an o-ring 104 may be placed on top of the mid-body assembly 110, and then a lid 102 may be used to cap the entire assembly. As shown in FIG. 2, the o-ring 104 forms a seal between the mid-body assembly 110 and the lid 102 and prevents the fluid from leaking from the top of the cassette assembly 100 (and seals the interior of the cassette assembly 100 to allow the scavenging material to scavenge the environment of oxygen).

As further shown in FIG. 2, the mid-body assembly 110 may include a mid-body assembly floor 202 that extends from an inner circumferential wall 204 of the mid-body assembly 110 towards an interior of the cassette assembly 100 in the radial direction. The mid-body assembly floor 202 may be slanted towards the membrane filter 120 to encourage the fluid to flow towards the membrane filter 120.

Although exemplary embodiments are described with reference to the depicted cassette assembly configuration for purposes of illustration, one of skill in the art will recognize that other types of cassette assemblies (with more, fewer, or a different configuration of parts) or other sterile environments may also be used. Moreover, although exemplary embodiments are described in terms of microbiological sample testing using membrane filtration (and the structure in FIG. 1 and FIG. 2 is configured accordingly), other applications of the splashguard described below will be readily apparent.

Figure 3A:
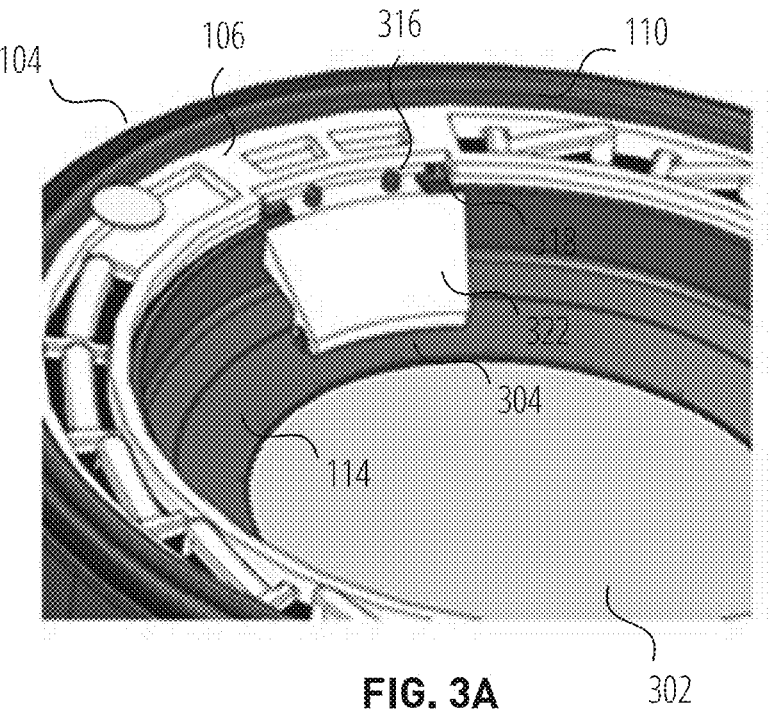
FIG. 3A depicts an exemplary splashguard attached to the cassette assembly in accordance with one embodiment.
Figure 3B:
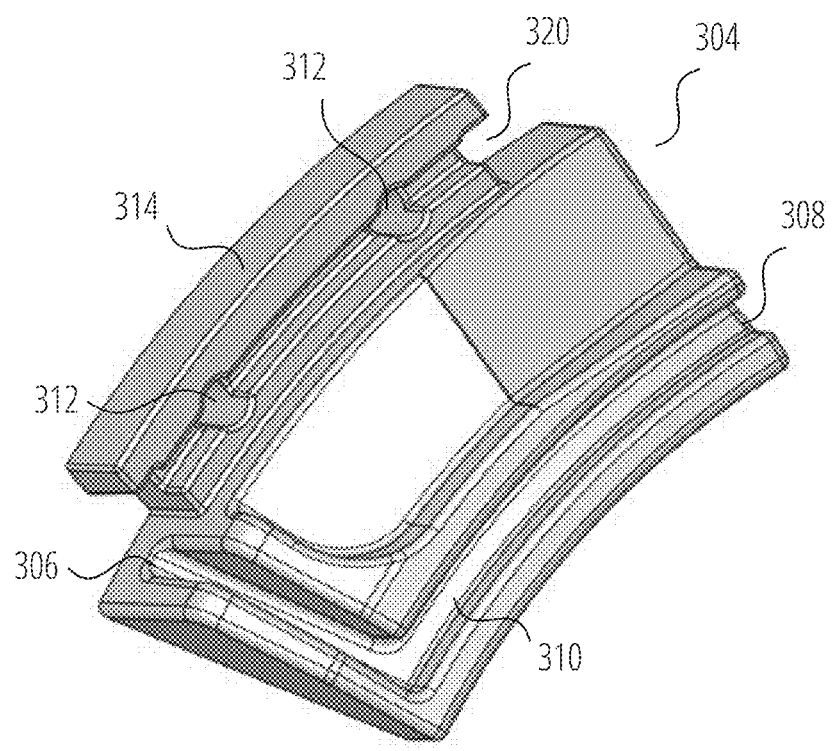
FIG. 3B is a bottom view of the exemplary splashguard in accordance with one embodiment.

An example of such a splashguard 304 is depicted in FIG. 3A and FIG. 3B. The splashguard 304 mounts to an inner circumference of the mid-body assembly 110 and/or of the foil cutter 106. The splashguard 304 includes a cover 322 that is situated between the mid-body inlet 116 and the lid 102, to prevent fluid that enters the cassette assembly 100 through the inlet from splashing onto the lid 102 and thus obscuring the membrane filter 120 from view during analysis.

The splashguard 304 has a length that extends in the circumferential direction of the mid-body assembly 110, a height extending in an axial direction of the cassette assembly 100, and a width that extends in a radial direction of the cassette assembly 100. The length and/or width of the splashguard 304 may depend on a length and configuration of a fluid conduit or groove 310 used to redirect the fluid from the mid-body inlet 116 into the interior of the cassette assembly 100 (see FIG. 3B). For example, if the fluid is introduced into the cassette assembly 100 at a first high pressure, a first length of the groove 310 may be used, where the first length is calculated to reduce the high pressure to a suitably low target pressure. On the other hand, if the fluid is introduced to the cassette assembly 100 at a second high pressure that is higher than the first high pressure, a longer, wider, or different configuration of groove 310 may be needed to reduce the fluid to the low target pressure. This may require a longer and/or wider splashguard 304. Some embodiments may also or alternatively utilize the internal geometry of the mid-body assembly as part or all of the fluid path.

As shown in FIG. 3B, the groove 310 starts at an inlet 306 of the splashguard 304 configured to receive the fluid from the mid-body inlet 116 (and therefore configured to be aligned to the mid-body inlet 116). The groove 310 extends to an outlet 308 of the splashguard 304 after the groove 310 redirects the fluid flow around a bend (approximately 90 degrees in this embodiment, although other angles may be used depending on the typical fluid pressure at the mid-body inlet 116 and the desired target pressure at the outlet 308.

Figure 4:
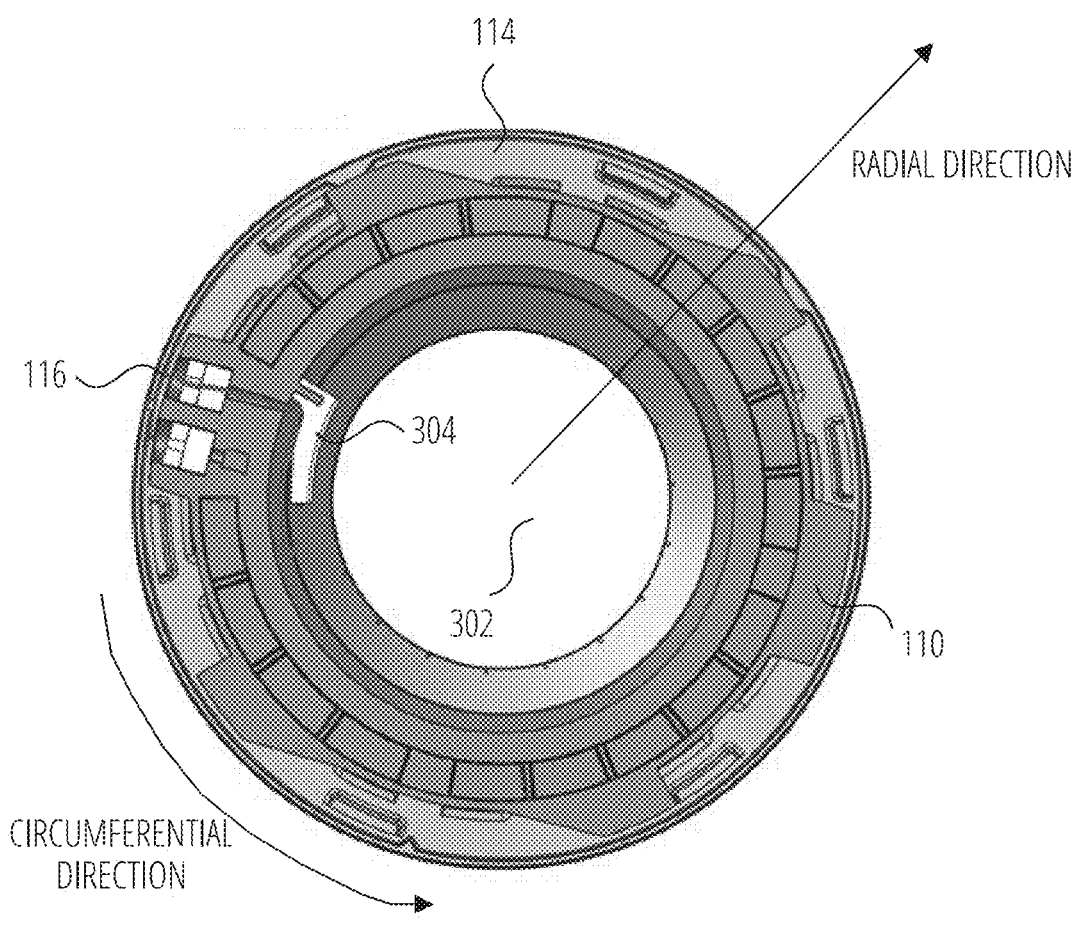
FIG. 4 is a top cutaway view showing fluid delivery through the splashguard in accordance with one embodiment.

The groove 310 may initially be configured to carry the fluid into the cassette assembly 100 in a radially inward direction. The groove 310 may then bend at an angle to redirect the flow of the fluid. In the depicted example, the groove 310 bends at approximately 90 degrees to redirect the flow from the radial to the circumferential direction (see FIG. 4). Thus, the latter portion of the groove 310 after the bend may not necessarily be perfectly straight, but rather may be slightly curved according to the curvature of (e.g.) the inner circumferential wall 204 of the mid-body assembly 110.

The groove 310 may be sized and shaped to reduce the pressure of the fluid received at the mid-body inlet 116. A width of the groove 310 may remain constant from the inlet 306 to the outlet 308. Alternatively, the width may vary (e.g., becoming wider as the groove 310 approaches the outlet 308). The outlet 308 may be positioned and shaped to encourage the fluid to exit the splashguard 304 in a particular pattern or in a particular direction. For example, the outlet 308 may be positioned to redirect the fluid towards the mid-body assembly floor 202.

The splashguard 304 may be open on the bottom or may be enclosed.

The height of the splashguard may depend on an amount of space (in the axial direction) available in the interior of the cassette assembly 100, between the membrane filter 120 (and/or the floor of the mid-body assembly 110) and the lid 102.

The splashguard 304 may be integral with the mid-body assembly 110 or the foil cutter 106 or may be mounted to either or both of those elements. For instance, the foil cutter 106 may include a cutout designed to accommodate a ledge 314 (see FIG. 3B) of the splashguard 304. The ledge 314 may be an extension of the splashguard 304 that extends away in a radial direction from a point where the splashguard 304 is configured to meet the inner circumferential wall of the mid-body assembly 110.

The mid-body assembly 110 (or the foil cutter 106) may include one or more protrusions that serve as fasteners 316, which may be passed through corresponding through-holes 312 in the ledge 314 of the splashguard. To facilitate installation of the fasteners 316 into the through-holes 312, the mid-body assembly 110 may also include one or more alignment protrusions 318 that are configured to mate with corresponding alignment recesses 320 on the splashguard 304 (or vice versa, with the protrusions provided on the splashguard 304 and the recesses provided on the mid-body assembly 110 and/or foil cutter 106). The alignment protrusions 318 and the fasteners 316 may be located so that, when the splashguard 304 is mounted to the cassette assembly

100, the inlet 306 of the splashguard 304 aligns to the mid-body inlet 116 of the mid-body assembly 110.

Figure 5:
FIG. 5 is a flowchart depicting an exemplary method for deploying a cassette assembly with a splashguard in accordance with one embodiment.
Figure 5:
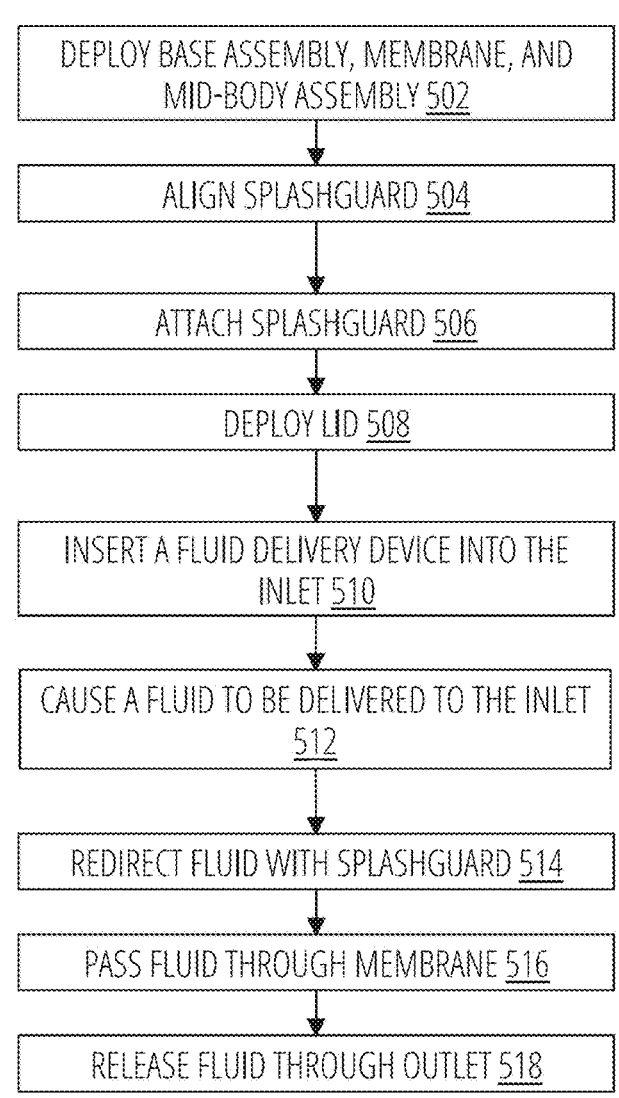

FIG. 5 is a flowchart depicting an exemplary method for deploying a splashguard in a cassette assembly.

In block 502, a base assembly, membrane, and mid-body assembly may be deployed. For example, the base assembly may be placed on a suitable surface in a testing area, and the membrane (and/or a media pad) may be placed on the base assembly. A seal (such as an o-ring) may be put into position around a circumference of an appropriate portion of the base assembly. A mid body assembly may then be lowered onto the base assembly, so that the o-ring creates a seal and/or locks the mid-body assembly to the base assembly.

In some embodiments, the splashguard may be integral with the mid-body assembly or an optional foil cutter. If not, in block 504 the splashguard may be aligned. For example, the splashguard may be placed between suitable alignment protrusions provided on the mid-body assembly and/or the foil cutter. Alternatively or in addition, protrusions may be provided on the splashguard, which may be aligned to recesses on the mid-body assembly and/or foil cutter. The protrusions and recesses may be shaped and configured to mate with each other.

In block 506, the splashguard may be attached to the mid-body assembly and/or foil cutter. For example, one or more fasteners attached to the cassette assembly (e.g., the mid-body assembly and/or the foil cutter) may be inserted into one or more through-holes of the splashguard. Alternatively or in addition, one or more fasteners on the splashguard may be placed into one or more holes (which may extend partially or entirely through the mid-body assembly and/or the foil cutter) of the cassette assembly.

In block 508, the lid may be deployed on the cassette assembly. This may involve providing an o-ring at a suitable location on the mid-body assembly, and then securing the lid at an inner or outer circumference of the o-ring.

In block 510, a fluid delivery device may be inserted into an inlet of the mid-body assembly. For example, the inlet may include a rubber septum. The rubber septum may be pierced with a needle, and the fluid may be delivered to the inlet through the needle (at block 512). The fluid may be delivered through one or more tubes attached to the needle, or through another suitable delivery device.

In block 514, the fluid may be redirected with the splashguard. For example, the fluid may be caused to enter the inlet of the splashguard and may then be redirected around a groove in the splashguard. This may serve to reduce a pressure of the fluid between the inlet and a membrane.

In block 516, the fluid may be passed through the membrane. The fluid may then, at block 518, be released through an outlet in the base assembly. After the fluid is released, a growth medium may be provided to the vicinity of the membrane (e.g., through the mid-body inlet or another suitable inlet), and the cassette assembly may be left to incubate for a predetermined period of time. Any growth of microorganisms on the growth medium may then be measured (e.g., by imaging the growth medium through the lid, which may be optically transparent).

FIG. 5 depicts exemplary actions being taken in a certain order. However, embodiments are not limited to the order depicted. For example, another possible arrangement is to first align the splashguard (block 504) and then attach the splashguard to the mid-body assembly (block 506). Subsequently, the membrane and mid-body assembly (with splashguard attached) may be deployed, and then the mid-body assembly/splashguard/membrane may be deployed on the base assembly (block 502). The lid may then be deployed on top of the rest of the assembly.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:

a cassette assembly comprising a lid, a mid-body assembly including an inlet configured to receive one or more fluids at a first pressure and direct the one or more fluids into an internal space of the cassette assembly, a membrane filter, and an outlet configured to release the one or more fluids from the cassette assembly after the one or more fluids pass through the membrane filter; and a splashguard separate from the mid-body assembly and configured to interrupt a fluid flow between the inlet and the membrane filter, wherein the splashguard comprises a cover that extends between the inlet and the lid and a groove configured to change a direction of a flow of the one or more fluids, wherein the groove is provided on an underside of the cover of the splashguard.

2. The apparatus of claim 1, wherein the splashguard is configured to reduce the pressure of the one or more fluids from the first pressure to a second pressure lower than the first pressure.

3. The apparatus of claim 1, wherein the cassette assembly comprises a base assembly comprising the outlet.

4. The apparatus of claim 3, wherein the splashguard is provided between the lid and the mid-body assembly.

5. The apparatus of claim 3, wherein the splashguard is provided on the mid-body assembly or on a foil cutter that is configured to be disposed between the lid and the mid-body assembly.

6. The apparatus of claim 1, wherein the splashguard comprises a through-hole configured to receive a fastener to attach the splashguard to the cassette assembly.

7. The apparatus of claim 6, wherein the fastener is built into the cassette assembly.

8. The apparatus of claim 1, wherein the splashguard redirects the one or more fluids that enter the inlet in a radial direction of the cassette to a circumferential direction of the cassette.

9. The apparatus of claim 1, wherein the splashguard and cassette assembly comprise mating alignment elements.

10. A method comprising:

assembling the cassette assembly and splashguard of claim 1;

inserting a fluid delivery device into the inlet; and causing a fluid to be delivered to the inlet, wherein the fluid is redirected by the splashguard.

11. The method of claim 10, wherein:

the inlet comprises a rubber septum, inserting the fluid delivery device into the inlet comprises piercing the rubber septum with a needle, and causing the fluid to be delivered to the inlet comprises delivering the fluid through the needle.

12. The method of claim 10, wherein assembling the cassette assembly and splashguard comprises inserting one or more fasteners attached to the cassette assembly into one or more through-holes of the splashguard.

13. The method of claim 10, wherein assembling the cassette assembly and splashguard comprises aligning the splashguard to the cassette assembly using one or more mating alignment elements provided on the cassette assembly and the splashguard.

14. The method of claim 10, further comprising using the splashguard to reduce a pressure of the fluid between the inlet and a membrane.

15. The method of claim 10, wherein the cassette assembly comprises a base assembly comprising the outlet and assembling the cassette assembly comprises:

attaching the splashguard above the mid-body assembly;

placing the mid-body assembly on the base assembly; and placing the lid over the splashguard and mid-body assembly.

16. The method of claim 15, further comprising providing a foil cutter on the mid-body assembly, wherein the splash-guard is attached to the foil cutter.

17. The method of claim 15, further comprising providing a seal between the mid-body assembly and the base assembly.

18. The method of claim 15, further comprising providing a seal between the mid-body assembly and the lid.

* * * * *